United States Patent
Tisol, Jr. et al.

(10) Patent No.: US 10,046,491 B2
(45) Date of Patent: Aug. 14, 2018

(54) SYSTEM AND METHOD OF MANUFACTURING A TWO-PART FASTENER

(71) Applicant: ILLINOIS TOOL WORKS INC., Glenview, IL (US)

(72) Inventors: James S. Tisol, Jr., Chippewa Falls, WI (US); Brock T. Cooley, Bloomer, WI (US); Benjamin H. Moerke, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 789 days.

(21) Appl. No.: 14/346,775

(22) PCT Filed: Sep. 25, 2012

(86) PCT No.: PCT/US2012/057054
§ 371 (c)(1),
(2) Date: Mar. 24, 2014

(87) PCT Pub. No.: WO2013/049024
PCT Pub. Date: Apr. 4, 2013

(65) Prior Publication Data
US 2014/0210132 A1    Jul. 31, 2014

Related U.S. Application Data

(60) Provisional application No. 61/541,249, filed on Sep. 30, 2011.

(51) Int. Cl.
*B29C 45/14* (2006.01)
*B29C 45/00* (2006.01)
(Continued)

(52) U.S. Cl.
CPC ...... *B29C 45/14467* (2013.01); *B29C 45/006* (2013.01); *B29C 2045/0065* (2013.01); *B29L 2031/7282* (2013.01)

(58) Field of Classification Search
CPC . B29C 45/14; B29C 45/1756; B29C 45/1775; B29C 45/1785
See application file for complete search history.

(56) References Cited

U.S. PATENT DOCUMENTS 6,315,250 B1    11/2001 Meyer
6,874,983 B2 *    4/2005 Moerke ............... F16B 19/1081
                                                   24/297
(Continued)

FOREIGN PATENT DOCUMENTS

EP    0499532 A1    8/1992
GB    753410 A    7/1956
(Continued)

OTHER PUBLICATIONS

Pye, R, "Assembling Parts in the Mold," Modern Plastics, McGraw-Hill, Inc., Lausanne, CH, vol. 47, No. 7, Jul. 1, 1970, pp. 90-92, 94, XP002052171.
(Continued)

*Primary Examiner* — Erin Snelting
(74) *Attorney, Agent, or Firm* — Joseph M. Butscher; The Small Patent Law Group, LLC

(57) ABSTRACT

A system for manufacturing a two-part fastener may include a fastener-molding housing and an actuating assembly. The fastener-molding housing may include a fastener mold having a first mold section connected to a second mold section through a flash connection mold section. The fastener mold is configured to receive fastener-forming material to form a pre-engaged fastener having a first fastener portion within the first mold section and a second fastener portion within the second mold section. The first fastener portion is temporarily secured to the second fastener portion through a flash connection portion formed within the flash connection mold section. The an actuating assembly includes a stripper plate, a connecting member, and at least one ejection mem-
(Continued)

ber. The connecting member is configured to securely retain the first fastener portion. The stripper plate is configured to be moved relative to the connecting member in order to drive one of the first or second fastener portions into the other of the first or second fastener portions to form a fully-formed fastener. The ejection member is configured to eject the fully-formed fastener from the actuating assembly.

20 Claims, 7 Drawing Sheets

(51) Int. Cl.
 *B29C 45/17* (2006.01)
 *B29L 31/00* (2006.01)

(56) References Cited

U.S. PATENT DOCUMENTS

| | | | |
|---|---|---|---|
| 6,921,113 B1 | 7/2005 | Vlasblom | |
| 7,157,037 B2* | 1/2007 | Seidelman | B29C 45/262 249/59 |
| 7,549,830 B2* | 6/2009 | Cooley | F16B 21/086 24/297 |
| 8,613,128 B2* | 12/2013 | Moerke | F16B 21/086 24/297 |
| 9,200,660 B2* | 12/2015 | Tisol, Jr. | F16B 21/02 |
| 2006/0099051 A1* | 5/2006 | Moerke | F16B 19/008 411/508 |
| 2006/0131787 A1* | 6/2006 | Seidelman | B29C 45/262 264/328.1 |
| 2008/0031701 A1* | 2/2008 | Boubtane | F16B 19/1081 411/80.1 |
| 2015/0252826 A1* | 9/2015 | Cooley | F16B 21/086 24/499 |

FOREIGN PATENT DOCUMENTS

| | | |
|---|---|---|
| JP | 61044615 A | 3/1986 |
| WO | 03/072957 A2 | 9/2003 |

OTHER PUBLICATIONS

ISR for PCT/US2012/057054 dated Feb. 22, 2013.

\* cited by examiner

SYSTEM AND METHOD OF MANUFACTURING A TWO-PART FASTENER

RELATED APPLICATIONS

This application is National Phase of International Application Number PCT/US2012/057054 filed Sep. 25, 2012, and claims priority from U.S. Provisional Patent Application No. 61/541,249 filed Sep. 30, 2011, which are hereby incorporated by reference in their entirety.

FIELD OF EMBODIMENTS OF THE INVENTION

Embodiments generally relate to a system and method of manufacturing a fastener, and, more particularly, to a system and method of manufacturing multiple parts of a fastener, such as a pin and grommet, using a single system.

BACKGROUND

Various devices are held together by multi-part fasteners. For example, a panel within a vehicle may be secured to another portion of the vehicle, such as a frame, through pin and grommet fasteners. As the name suggests, a pin and grommet fastener includes a pin and a separate and distinct grommet into which the pin is to be securely retained. The pin and grommet fastener allows for the pin and grommet to be separately secured to separate and distinct components before the pin is mated with the grommet Additionally, if the pin wears over time, or otherwise becomes damaged, the pin may be replaced, while the grommet remains in use. Similarly, if the grommet wears over time, or otherwise becomes damaged, the grommet may be replaced, while the pin remains in use. In this manner, the pin and grommet fastener differs from a single component fastener that typically must be completely replaced when a portion is damaged.

The process of manufacturing a typical pin and grommet usually involves molding the pin and the grommet with separate and distinct molds, and then utilizing machinery or manual labor to assemble the two parts into a proper position for delivery to a customer. In particular, known pin and grommet fasteners are manufactured using two injection molding machines, and two molds to produce the individual pin and grommet components (for example, a first mold for the pin, and a second mold, that is separate and distinct from the first mold, for the grommet). After the separate and distinct grommet and pin are formed through the separate and distinct grommet and pin molds, the grommet is connected to the pin, such as through an individual manipulating the separate components and then connecting them together. As such, the process of manufacturing a typical two-part fastener generally is more labor-intensive and costly, as compared to that of a single component fastener.

SUMMARY OF EMBODIMENTS OF THE INVENTION

Certain embodiments provide a system for manufacturing a two-part fastener. The system may include a fastener-molding housing and an actuating assembly.

The fastener-molding housing may include a fastener mold having a first mold section connected to a second mold section through a flash connection mold section. The fastener mold is configured to receive fastener-forming material, such as injected plastic, to form a pre-engaged fastener having a first fastener portion within the first mold section and a second fastener portion within the second mold section. The first fastener portion is temporarily secured to the second fastener portion through a flash connection portion formed within the flash connection mold section.

The actuating assembly may include a stripper plate, a connecting member, and at least one ejection member. The connecting member is configured to securely retain the first fastener portion. The stripper plate is configured to be moved relative to the connecting member in order to drive one of the first or second fastener portions into the other of the first or second fastener portions to form a fully-formed fastener. The ejection member(s) is configured to eject the fully-formed fastener from the actuating assembly.

The system may also include a fill housing connected to the fastener-molding housing. The fill housing may include an internal chamber having a fill inlet at a first end and an outlet gate at a second end. The outlet gate is in fluid communication with a mold inlet of the fastener mold. The fastener-forming material is configured to be deposited into the internal chamber through the fill inlet.

One or both of the pre-engaged fastener or the connecting member may include at least one undercut portion configured to securely retain the first fastener portion to the connecting member. The undercut portion(s) may include inwardly-angled ledges formed on the connecting member. Optionally, the undercut portion(s) may include cored-out portions formed on or in the first fastener portion.

In an embodiment, the first fastener portion includes a pin and the second fastener portion includes a grommet.

The fastener-molding housing may be selectively actuated between open and closed positions. The pre-engaged fastener may be formed within the fastener mold in the closed position. The pre-engaged fastener may be exposed in the open position. At least one actuator may move the fastener-molding housing between the open and closed positions.

The stripper plate may be operatively connected to at least one actuating member configured to move the stripper plate relative to the connecting member. The actuating member may include a piston assembly having a piston slidably retained within a sleeve, and a motor configured to move the piston within the sleeve.

The system may also include a controller operatively connected to the fastener-molding housing and the actuating assembly. The controller is configured to control operation of the system.

Certain embodiments provide a method of manufacturing a two-part fastener. The method may include depositing fastener-forming material into a fastener mold having a first mold section connected to a second mold section through a flash connection mold section, and allowing the fastener-forming material to harden within the fastener mold to form a pre-engaged fastener having a first fastener portion within the first mold section and a second fastener portion within the second mold section, wherein the first fastener portion is temporarily secured to the second fastener portion through a flash connection portion formed within the flash connection mold section. The method may also include securely retaining the first fastener portion of the pre-engaged connector with a connecting member of an actuating assembly, moving a stripper plate of the actuating assembly relative to the connecting member, driving one of the first or second fastener portions into the other of the first or second fastener portions through the moving operation to form a fully-formed fastener, and ejecting the fully-formed fastener from the actuating assembly.

The method may also include depositing the fastener-forming material into an internal chamber of a fill housing positioned over the fastener mold, and allowing the fastener-forming material to pass into the fastener mold through an outlet gate of the fill housing.

The method may also include securely retaining the first fastener portion of the pre-engaged fastener to the connecting member through at least one undercut portion. The undercut portion may include inwardly-angled ledges formed on the connecting member. Alternatively, the undercut portion may include cored-out portions formed on or in the first fastener portion.

The first fastener portion may include a pin and the second fastener portion may include a grommet.

The method may also include selectively actuating the fastener-molding housing between open and closed positions. The pre-engaged fastener is formed within the fastener mold in the closed position. The pre-engaged fastener is exposed in the open position.

The method may also include controlling the depositing, allowing, moving, driving, and ejecting operations with a controller.

Figure 1:
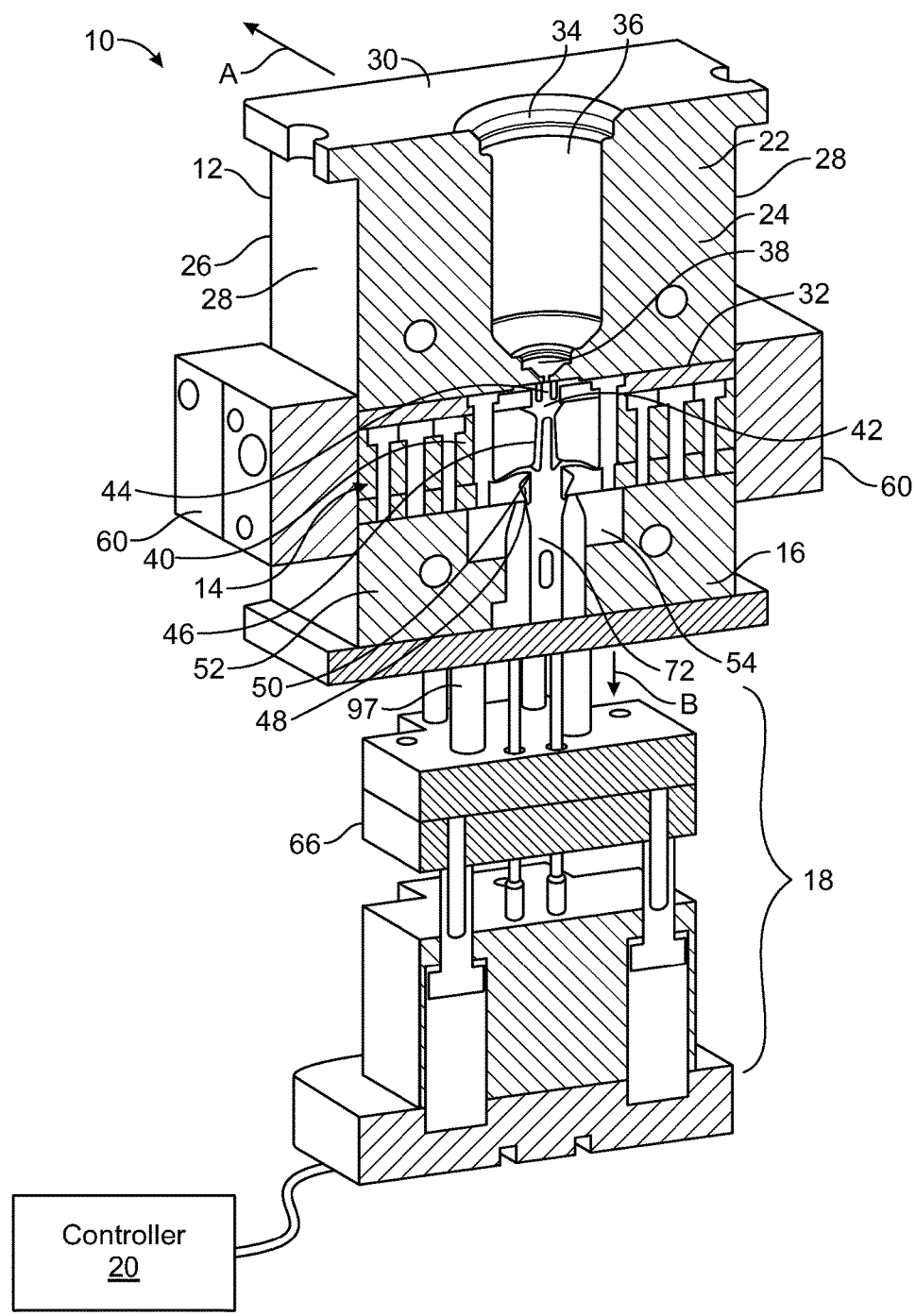
FIG. 1 illustrates a system for manufacturing a two-part fastener, according to an embodiment.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

FIG. 1 illustrates a system 10 for manufacturing a two-part fastener, such as a pin and grommet fastener, according to an embodiment. The system 10 includes a fill housing 12 positioned over a fastener-molding housing 14, which is, in turn, connected to an actuating assembly 16. The actuating assembly 16 may be operatively connected to an operating assembly 18 having a series of actuators and the like. The operating assembly 18 may be electrically connected to a controller 20 that controls operation of the operating assembly 18, for example. The controller 20 may control operation of the entire system 10. For example, the controller 20 may be operatively connected to the fastener-molding housing 14 and/or separating actuators 60 that are operatively connected to the fastener-molding housing 14. The controller 20 may control the actuators 60 to separate the fastener-molding housing 14 to expose a pre-engaged fastener, as described below. The controller 20 may include a microcontroller, microprocessor, integrated circuit, or equivalent control circuitry designed specifically to control operation of the system 10. The controller 20 may include RAM or ROM memory, logic, and timing circuitry, state machine circuitry, and the like, to facilitate operation of the system 10. The controller 20 may be connected to the system 10 through a wired or wireless connection.

The fill housing 12 includes a main body 22 having front and rear walls 24 and 26, respectively, integrally connected to lateral walls 28, an upper wall 30, and a base 32. An inlet 34 is formed through the upper wall 30 and connects to an internal chamber 36 that leads to an outlet nozzle or gate 38 at the base 32. The inlet 34 has a diameter that is larger than that of the outlet nozzle or gate 38. The outlet nozzle or gate 38 funnels down from the internal chamber 36. As such, the inlet 34 is configured to receive fastener-forming material, such as injection mold plastic, resin, or the like, while the outlet nozzle or gate 38 is configured to allow the fastener-forming material to be injected into the fastener-molding housing 12.

The fastener-molding housing 12 includes a main body 40 defining a fastener mold 42. The fastener mold 42 includes an inlet 44 in fluid communication with the outlet nozzle or gate 38. The inlet 44 connects to a first mold section, such as a pin mold section 46, which connects to a second mold section, such as a grommet mold section 48, through a flash connection mold section 50. The first mold section is configured to form a first mold portion, such as a pin, while the second mold section is configured to form a second mold portion, such as a grommet. The flash connection mold section 50 may include one or more channels that connect the pin mold section 46 to the grommet mold section 48. The flash connection mold section 50 is configured to allow fastener-forming material to flow from the pin mold section 46 to the grommet mold section 48.

Figure 5:
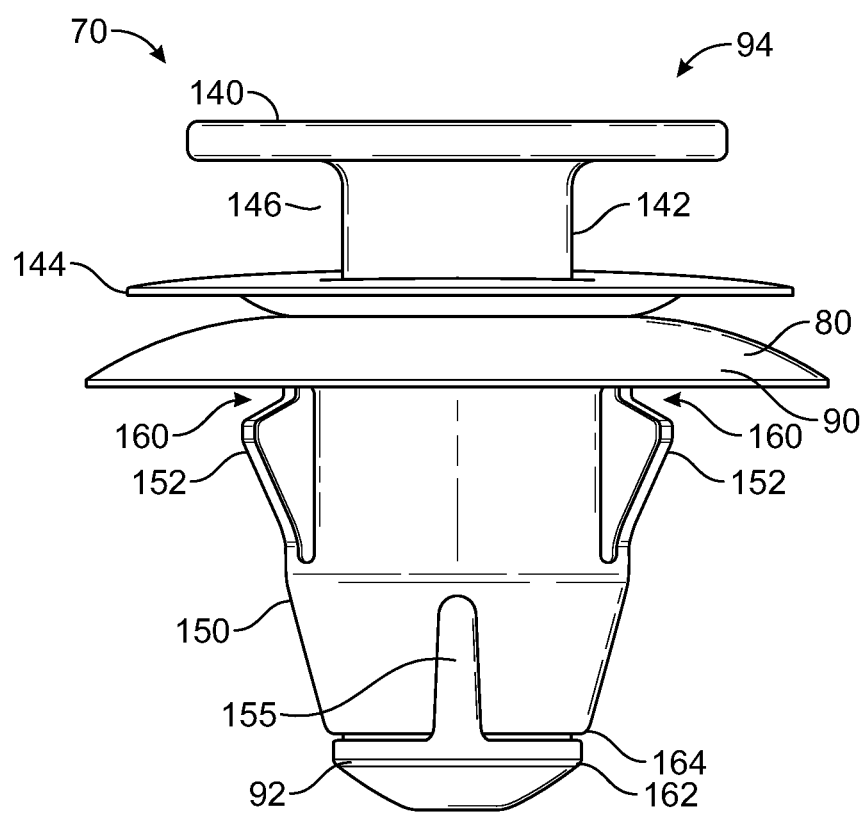
FIG. 5 illustrates a front view of a fully-formed fastener, according to an embodiment.
Figure 6:
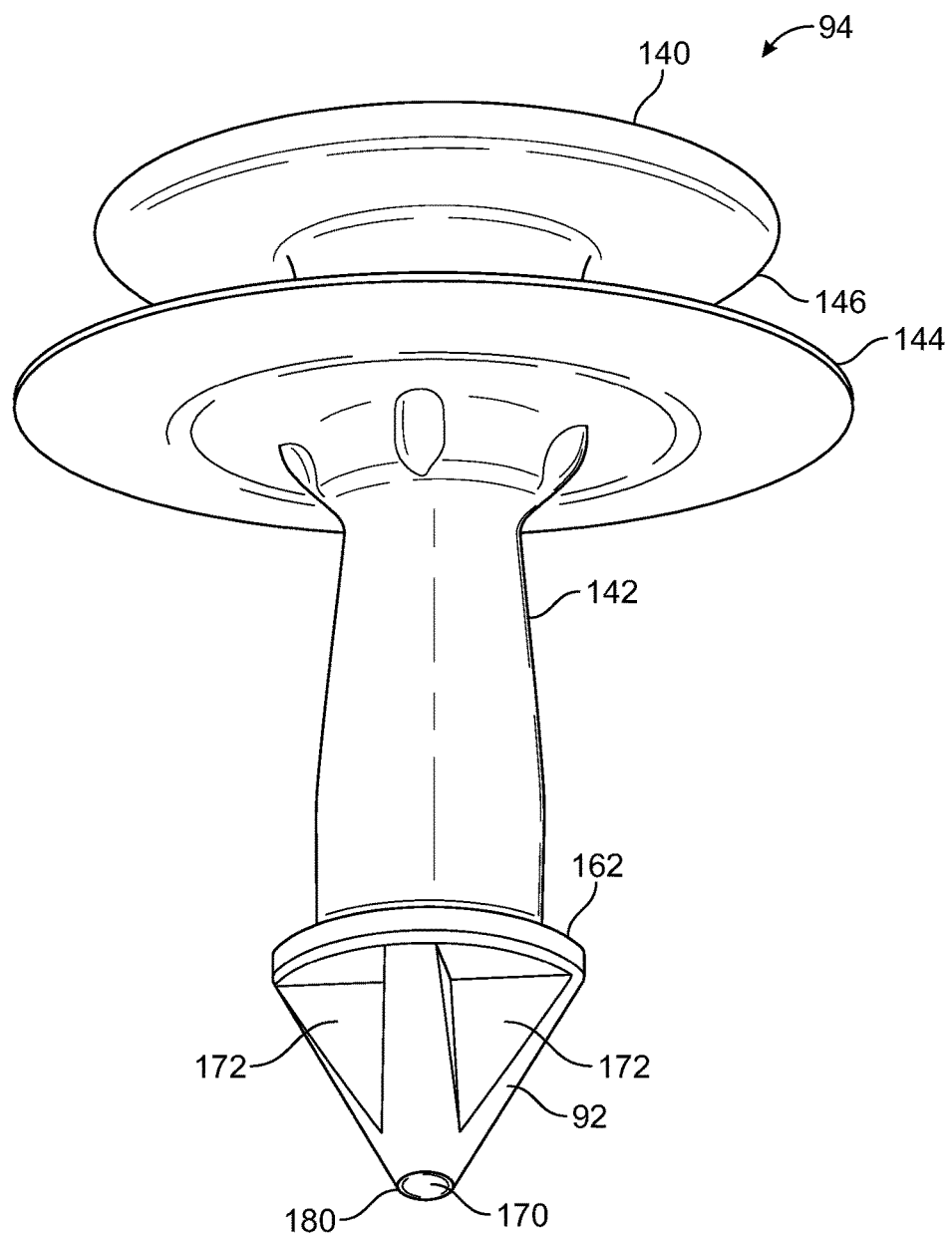
FIG. 6 illustrates a front view of a pin, according to an embodiment.

The fastener mold 42 may be sized and shaped to produce a pin and grommet, as shown in FIGS. 5 and 6, for example. That is, the pin mold section 46 may be sized and shaped to form a pin, such as shown in FIG. 5 or 6, while the grommet mold section may be sized and shaped to form a grommet, such as shown in FIG. 5, for example.

The actuating assembly 16 includes a main body 52 having an actuatable stripper plate 54 underneath the grommet mold section 48. The actuating assembly 16 is configured to connect a pin formed in the pin mold section 46 to a grommet formed in the grommet mold section 48 together, and then to eject the formed and connect pin and grommet from the system 10, as described below.

In operation, initially, fastener-forming material, such as liquid plastic, resin, or the like, is poured or otherwise placed into the internal chamber 36 of the fill housing 12. The controller 20 may monitor the filling operation. For example, the controller 20 may be operatively connected to a sliding wall positioned between the outlet nozzle or gate 38 and the inlet 44. For example, the gate 38 may be selectively positioned between open and closed positions. The controller 20 may move the gate 38 between the open and closed positions. When the controller 20 determines that a suitable amount of material for forming a fastener is positioned within the internal chamber 36 (such as through determining the amount of material within the internal chamber 36 by detecting the force exerted into the sliding wall or gate 38), the controller 20 may open the wall or gate 38 so that the fastener-forming material flows into the fastener mold 42.

Once the fastener-forming material flows into the fastener mold 42, the fastener-forming material flows into and through the pin mold section 46 and into the grommet mold section 48 through the flash connection mold section 50. The controller 20 may monitor the flow of the fastener-forming material into the fastener mold 42. For example, the controller 20 may be operatively connected to a metering device or other such level sensor proximate the outlet nozzle or gate 38. When the controller 20 determines that all of the fastener-forming material has flowed out of the internal chamber 36 and into the fastener mold 42, the controller 20 allows sufficient time for the fastener-forming material to harden or otherwise form within the fastener mold 42. After the fastener-forming material has hardened or otherwise formed, the controller 20 then operates the actuating assembly 16 to connect the pin and grommet together, as explained below.

When the fastener forming material has hardened or otherwise fully formed within the fastener mold 42, the controller 20 may open the fastener-molding housing 12. For example, the controller 20 may operate actuators, such as the lateral actuators 60, to separate the fastener-molding housing 12 to expose the pre-engaged fastener. Optionally, the controller 20 may operate actuators to slide the fill housing 12 off the top fastener-molding housing 14 in the direction of arrow A, for example. Alternatively, the controller 20 may operate actuators to move the fastener-molding housing 14 away from the fill housing 12 in the direction of arrow A, for example. Also, alternatively, the controller 20 may operate actuators to lift the fill housing 12 off the fastener-molding housing 14, or, alternatively, pull the fastener-molding housing 14 under and away from the fill housing 12. As another example, the controller 20 may operate actuators 66 to pull the actuating assembly 16, which retains a pre-formed fastener within the fastener-molding housing 14, away from the fastener-molding housing 14 in the direction of arrow B. Alternatively, an individual may manually separate and open the fastener-molding housing 12.

The fastener-molding housing 14 may be configured to separate in half about a central seam, for example. In this manner, the fastener-molding housing 14 may be connected to actuators that are configured to open the fastener-molding housing 14 in half about the seam. Thus, after the pin and grommet have been formed within the fastener-molding housing 14, the controller 20 may open the fastener-molding housing 14, thereby exposing the pre-engaged fastener, such as the pin and grommet connected to a connecting member 72 extending from the actuating assembly 16.

Figure 2:
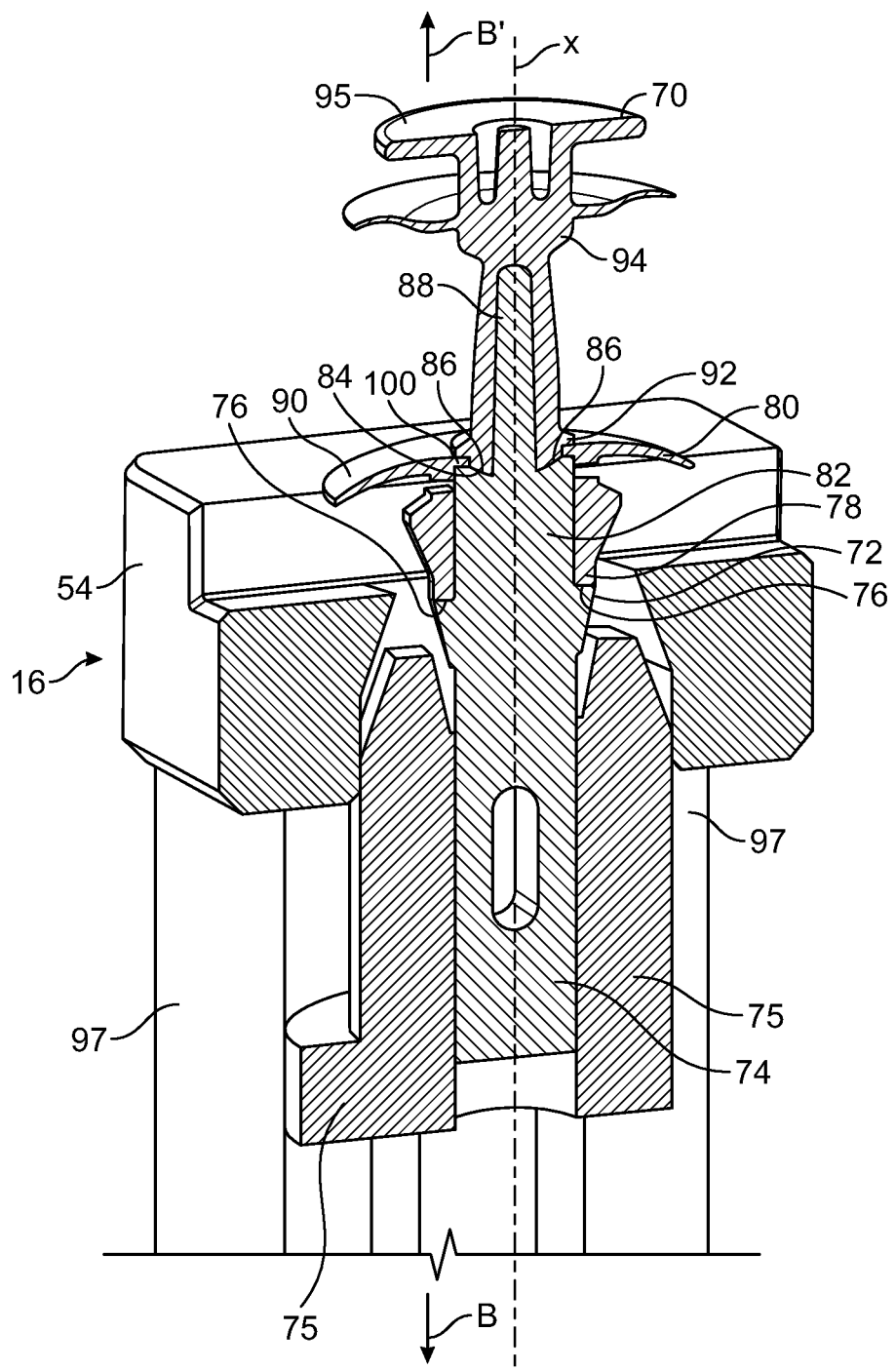
FIG. 2 illustrates an actuating assembly retaining a pre-formed fastener, according to an embodiment.

FIG. 2 illustrates the actuating assembly 16 retaining a pre-engaged fastener 70, according to an embodiment. As noted above, the fastener-molding housing 14 may be opened to reveal the pre-engaged fastener 70. The fastener 70 is "pre-engaged" in that the fastener-forming material has cooled and hardened to form the fastener 70, but a pin 94 is not operatively connected or engaged to a grommet 80. Instead, the pin 94 is temporarily connected to the grommet 80 through flash connections, such as the flash connections 100.

The pre-engaged fastener 70 has been molded and hardened within the fastener mold 42, which was opened by way of the controller 20 opening the fastener-molding housing 14, such as described above. The actuating assembly 16 includes a central connecting member 72 that is aligned along a central longitudinal axis x of the pre-engaged fastener 70. The connecting member 72 includes a distal beam 74 connected within a retaining sleeve 75 that may be moveably secured to the stripper plate 54. In an embodiment, the retaining sleeve 75 remains stationary and fixed within the actuating assembly 16, while the stripper plate 54 is connected to actuating members 97 that are configured to move the stripper plate 54 off of the retaining sleeve 75, or vice versa. The distal beam 74 connects to an annular ridge 76 that supports a base 78 of a grommet 80. The base 78 is not fastened to the annular ridge 76. The annular ridge 76 connects to a shaft 82 having an upper end 84 with undercut portions, such as inwardly-angled ledges 86, around a central core post 88 that extends upwardly from the upper end 84. The annular ridge 76 supports and retains a retaining nose 92 of a pin 94, through undercut portions.

Once the pre-engaged fastener 70 is cooled and hardened, the controller 20 may open the fastener-molding housing 14 (shown in FIG. 1), thereby exposing the pre-engaged fastener 70. The controller 20 may then push the stripper plate 54 upwardly in the direction of arrow B' through operation of the actuating members 97, such as posts, pistons, or the like, operatively connecting to driving motors. For example, the actuating members 97 may be pneumatic or hydraulic piston assemblies having slidable pistons retained within sleeves. The slidable pistons may be actuated by motors, for example. Optionally, various other actuating members may be used.

During the movement of the stripper plate 54 in the direction of arrow B', the pin 94 remains stationary due to the inwardly-directed ledges 86 and the central core post 88 of the connecting member 72 exerting retaining forces into the pin 94. The inwardly-directed ledges 86 provide undercut portions that ensure that the pin 94 remains secured to the connecting member 72 while the stripper plate 54 urges the grommet 80 into the pin 94. The inwardly-directed ledges 86 provide a secure connection between the pin 94 and the connecting member 72. Optionally, a base 95 of the pin 94 may abut against the base 32 of the fill housing 12 (shown in FIG. 1), or another portion of the system 10, thereby preventing the pin 94 from moving upwardly in the direction of arrow B'. Movement of the stripper plate 54 in the direction of arrow B' forces the grommet 80, which is supported by the annular ridge 76, upwardly into the pin 94 in the direction of arrow B'. Because the pin 94 is secured from movement through the connecting member 72, movement of the grommet 80 by way of the stripper plate 54 breaks the flash connection 100 between the pin 94 and the grommet 80.

Alternatively, instead of the stripper plate 54 pushing the grommet 80 into the pin 94 in the direction of arrow B', the controller 20 may operate the system 10 to pull the retaining sleeve 75 downwardly in the direction of arrow B. As the retaining sleeve 75 moves downwardly in the direction of arrow B, the connecting member 72 follows in the same direction. Because the connection member 72 is connected to the pin 94, the pin 94 moves in the direction of arrow B into the grommet 80. Movement of the connecting member 72 in the direction of arrow B forces the retaining nose 92 into a channel defined through the annular flange 90 of the grommet 80. During the movement of the pin 94 in the direction of arrow B, the flash connection 100 between the nose 92 and the grommet 80 breaks. In this embodiment, the stripper plate 54 holds the grommet 80 stationary, while the connecting member 72 moves in the direction of arrow B, thereby breaking the flash connection 100.

Figure 3:
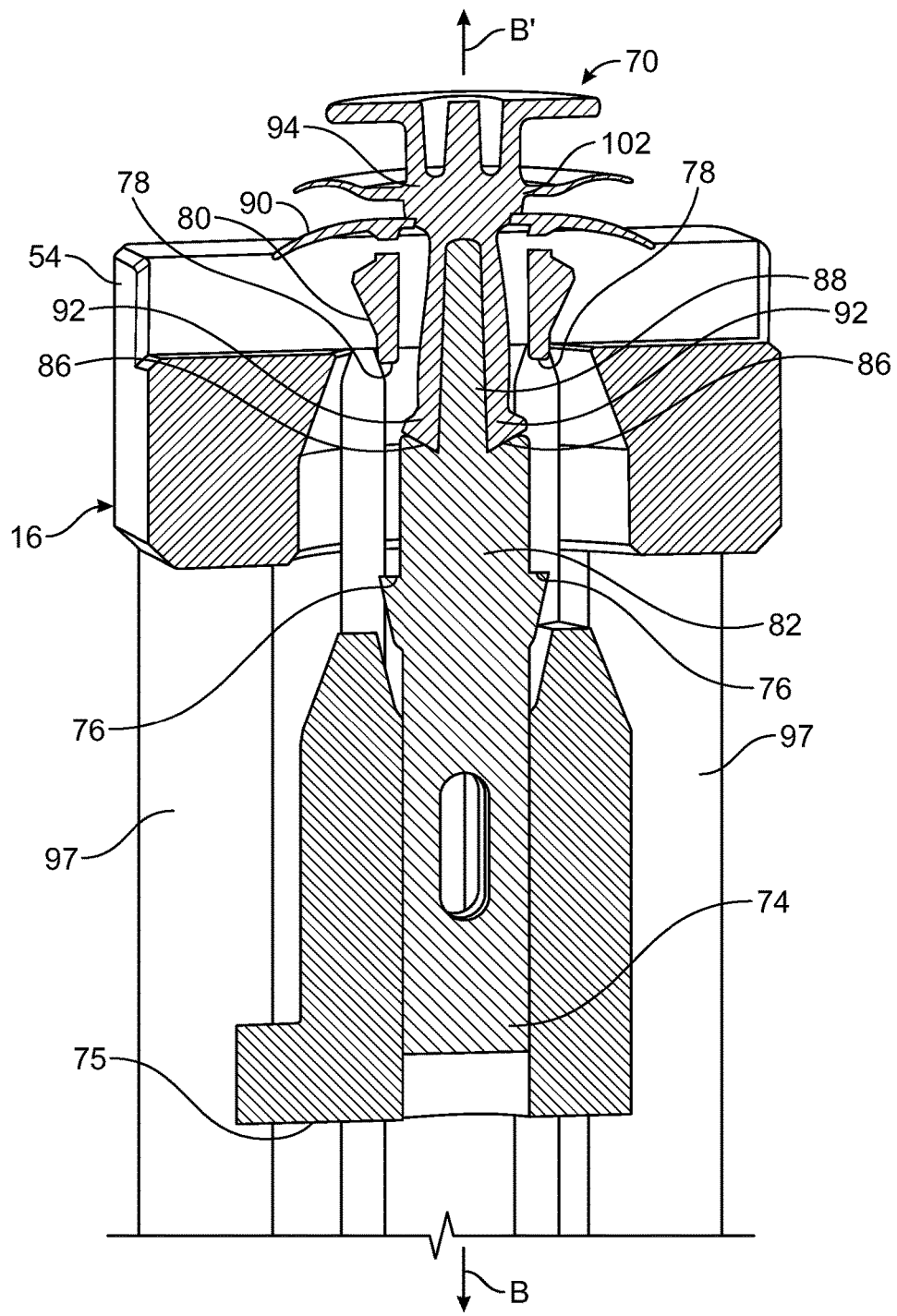
FIG. 3 illustrates an actuating assembly securing a pin to a grommet, according to an embodiment.

FIG. 3 illustrates the actuating assembly 16 securing the pin 94 to the grommet 80, according to an embodiment. As shown in FIG. 3, the grommet 80 is driven into the pin 94 through the stripper plate 54 being forced upwardly in the direction of arrow B'. The grommet 80 may be secured within the stripper plate 54, such that movement of the stripper plate 54 forces the grommet 80 off of the annular ridge 76 and toward the pin 94. The pin 94 may be held stationary through the connecting member 72. Alternatively, the grommet 80 may be held stationary by the stripper plate 54 through the annular flange 90 being secured over the stripper plate 54, while the pin 94 is pulled down in the direction of arrow B by the connecting member 72.

In the embodiments, as the stripper plate 54 moves relative to the connecting member 72 (whether through the stripper plate 54 being pushed upwardly in the direction of arrow B', or the connecting member 72 being pulled down in the direction of arrow B), the annular ridge 76 separates from the base 78 of the grommet 80, which remains in place within the stripper plate 54. The grommet 80 is driven toward the pin 94 through the central core post 88 and the inwardly-angled ledges 86 that retain the nose 92 of the pin 94. The stripper plate 54 continues to drive the grommet 80 into the pin 94 in the direction of arrow B', or the connecting member 72 continues to move the pin 94 into the grommet 80 in the direction of arrow B, until a base 102 of the pin 94 snapably secures into the annular flange 90 of the grommet 80. As such, the pin 94 is formed with the grommet 80. Accordingly, the fully-formed fastener 70 is ready to be ejected or otherwise removed from the actuating assembly 16.

Figure 4:
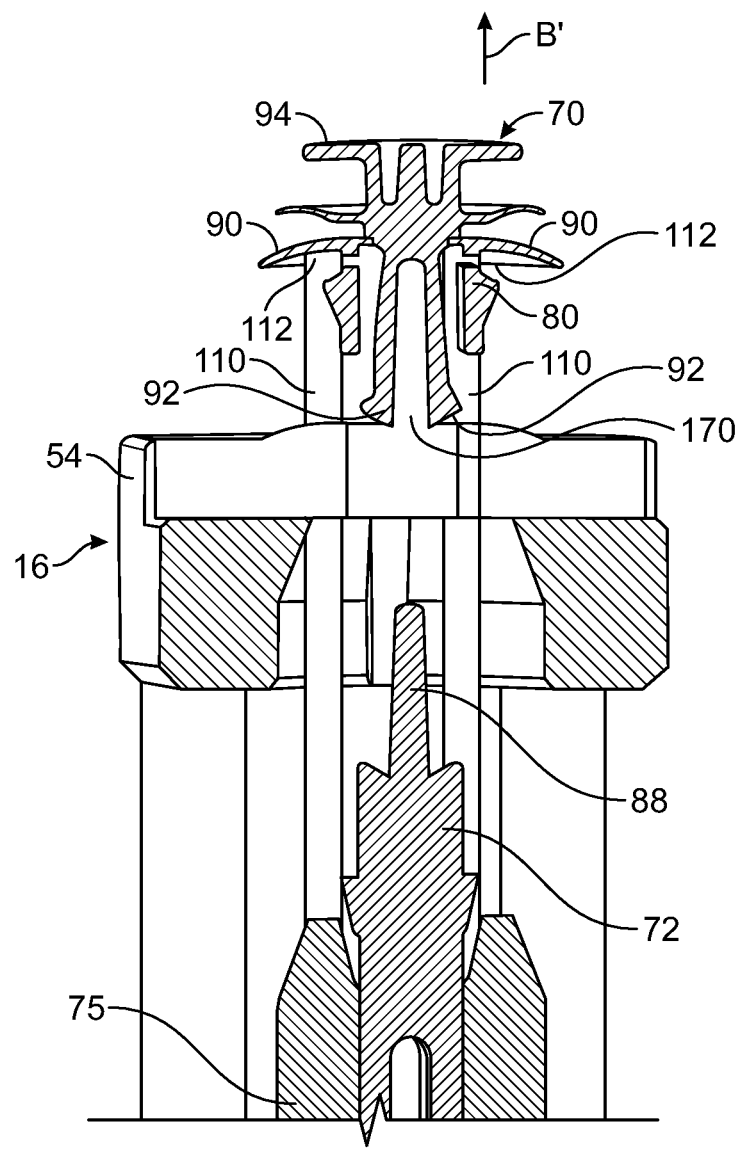
FIG. 4 illustrates a fully-formed fastener being ejected from an actuating assembly, according to an embodiment.

FIG. 4 illustrates a fully-formed fastener 70 being ejected from an actuating assembly, according to an embodiment. After the stripper plate 54 or the connecting member 72 is actuated (such as through operation of the controller 20 shown in FIG. 1) to form the fully-formed fastener 70, as described above, ejection members 110, such as sliding columns, posts, pistons, pins, or the like, are urged upwardly in the direction of arrows B'. The ejection members 110 may be pneumatic or hydraulic piston assemblies, for example. For example, the ejection members 110 may be pneumatic or hydraulic piston assemblies having slidable pistons retained within sleeves. The slidable pistons may be actuated by motors, for example. Engaging ends 112 of the ejection members 110 move into the annular flange 90 of the grommet 80 and continue to push upwardly in the direction of arrow B'. Because the pin 94 is now snapably secured to the grommet 80, the fully-formed fastener 70 moves upwardly in the direction of arrow B', thereby separating the pin 94 from the connecting member 72. Accordingly, the fully-formed fastener 70 may be ejected and removed from the actuating assembly 16.

FIG. 5 illustrates a front view of the fully-formed fastener 70, according to an embodiment. The fastener 70 includes the pin 94 secured to the grommet 80. As described above, the fastener 70 has been formed within and ejected from the system 10, shown in FIG. 1, for example. The pin 94 includes a head 140 connected to a shaft 142 that, in turn, connects to the distal nose 92. A collar 144 may be formed about the shaft 142 proximate the head 140, defining a panel-retaining area 146 therebetween. The pin 94 may be secured to a panel, for example, by way of the head 140 being urged into an opening of the panel, and edges defining the opening being retained between the head 140 and the collar 144.

The grommet 80 includes the annular flange 90 integrally connected to a pin-retaining base 150 that receives and snapably retains the nose 92 of the pin 94. Snap ledges 152 may extend outwardly from the base 150 and a panel-retaining area 160 may be defined between the snap ledges 152 and an underside of the annular flange 90. The base 150 may be inserted into an opening formed in another panel, such that edges defining the opening are secured between the flange 90 and the snap ledges 152.

Thus, the pin 94 may be a secured to a first panel, while the grommet 80 may be secured to a second panel. Once secured to respective panels, the pin 94 may be snapably secured to the grommet 80 in order to secure the panels together through an expanded ledge 162 of the nose 92 snapably engaging a terminal edge 164 of the base 150. As shown, the base 150 may include slits or channels 155 formed through the terminal edge 164, which allow the base 150 to flex and allow the nose 92 to pass therethrough until the expanded ledge 164 snapably engages the terminal edge 164.

Upon manufacture of the fastener 70, as described above, the pin 94 is securely connected to the grommet 80, as shown in FIG. 5. A user may disconnect the pin 94 from the grommet 80, in order to secure the pin 94 to a first panel, and the grommet 80 to a second panel. The pin 94 may then be snapably secured to the grommet 80 in order to connect the panels together.

FIG. 6 illustrates a front view of the pin 94, according to an embodiment. As noted, the pin 94 includes a retaining ledge 162 that snapably secures to the grommet 80, as described above. The pin 94 may include a central channel 170 formed by the central core post 88 of the connecting member 72, as shown in FIG. 4, for example. The central channel 170 allows the pin 94 to be retained by the connecting member 72 during the manufacturing process, as described above. Additionally, the nose 92 may include cored-out portions 172 that are configured to be retained by reciprocal protuberances extending outwardly from the ledges 86 of the connecting member 72, in order to provide increased retaining force during the manufacturing process. The cored-out-out portions 172 may provide undercut portions in addition to, or in lieu of, the ledges 86 shown in FIGS. 2-4, for example. That is, the cored-out portions 172 may engage reciprocal features extending from the connecting member that ensure that the pin 94 remains secured to the connecting member during the manufacturing process.

The cored-out portions 172 may be recessed areas, such as divots, channels, or the like, formed from a tip 180 of the nose 92 to the ledge 162. Alternatively, the cored-out portions 172 may extend along greater or less lengths of the pin 94 that shown. In an embodiment, the pin 94 may not include the central channel 170. Instead, the shaft 142 may be molded and formed as a solid piece. The cored-out portions 172 ensure that the pin 94 remains securely connected to the connecting member when the grommet is urged into the pin 94, or vice versa. In this embodiment, the connecting member may not include a central core post that extends into the pin 94.

Referring to FIGS. 1-6, as noted above, the controller 20 may control the entire operation of the system 10. The controller 20 may be connected to components of the system 10, such as the fill housing 12, the fastener molding housing 14, the actuating assembly 16, and/or the operating assembly 18, through wired or wireless connections. Alternatively, operation of the system 10 may be manually controlled.

The controller 20 may communicate with the components of the system 10 through various communication systems such as Bluetooth, GSM, infrared wireless LANs, HIPER-LAN, 3G, satellite, as well as circuit and packet data procedures, and the like. The controller 20 may be directly connected to the system 10. Alternatively, then controller 20 may be remotely located from the system 10.

Figure 7:
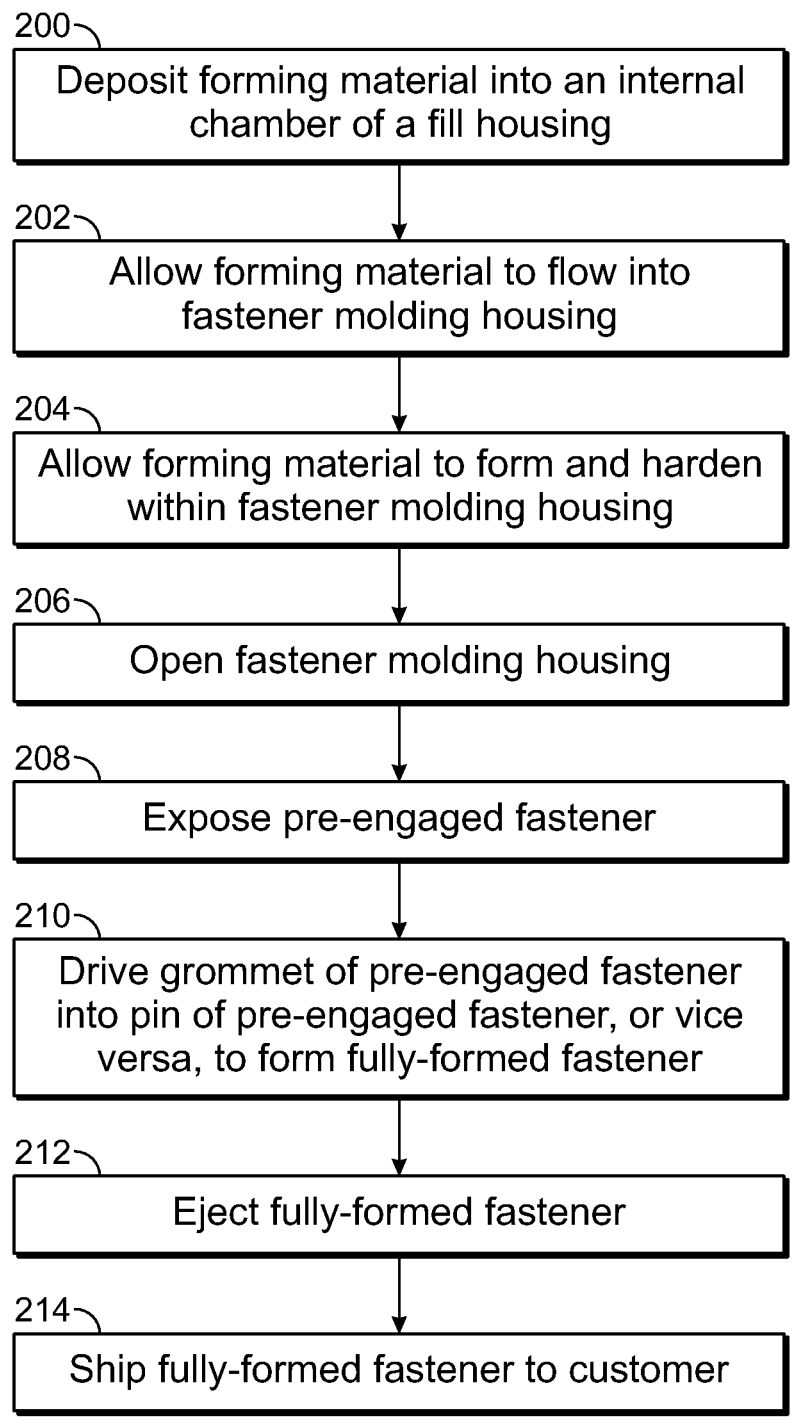
FIG. 7 illustrates a method of manufacturing a fastener, according to an embodiment.

FIG. 7 illustrates a method of manufacturing a fastener, according to an embodiment. At 200, forming material, such as liquid plastic, resin, or the like, is deposited into an internal chamber of a fill housing. At 202, the forming material flows into a fastener mold of a fastener-molding housing. The fastener mold includes a pin mold section connected to a grommet mold section through a flash connection area. The forming material forms and hardens at 204.

After the forming material has formed and hardened within the fastener mold, the fastener-molding housing is opened at 206. For example, portions of the fastener-molding housing may be separated, such as through actuators separating the two halves of the fastener-molding housing apart. Upon separation of the portions of the fastener-molding housing, a pre-engaged fastener is exposed at 208.

At 210, a grommet portion of the fastener, which has been formed within the grommet mold section, is driven or pushed into a pin portion of the fastener, which has been formed within the pin mold section, through actuation of a stripper plate (and/or a connection member). Alternatively, the pin portion may be driven or pulled into the grommet portion. During the driving operation, the flash connection between the pin and grommet portions is broken. The grommet portion is driven into the pin portion, or vice versa, until the grommet portion is securely connected to the pin portion. Once the grommet fully and securely engages the pin, the fastener is fully formed. At 212, the fully-formed fastener is ejected from the system, such as through actuating members. At 214, the fully-formed fastener, as ejected, may be shipped to a customer.

Thus, embodiments provide a system and method of molding pin and grommet portions of a fastener with a single system. Additionally, embodiments provide a system and method of assembling the pin and grommet portions of a fastener into a final position for delivery. Because the portions are connected to each other during delivery, there is less risk of misplacing a pin with respect to a grommet. For example, upon delivery of multiple fully-formed fasteners, the risk of unmatched pairs of pins and grommets is eliminated because the components are connected together as a single piece (as opposed to pins and grommets being separately manufactured and delivered).

Embodiments provide a system and method of molding a pin and grommet as a single piece, and then assembling the pin and grommet together for delivery in a single efficient manufacturing cycle.

Embodiments provide a system and method for manufacturing a two-component fastener, such as a pin and grommet fastener, in an efficient and economical way. A single system may be used to produce the fastener. Thus, equipment and labor costs typically associated with two-part fasteners are reduced. Further, product lead times are reduced because the final fastener is ready to be shipped almost immediately after the manufacturing process. That is, the system and method do not require a separate and distinct assembly process after the fully-formed fastener is ejected from the system.

While various spatial and directional terms, such as top, bottom, lower, mid, lateral, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the embodiments disclosed and defined herein extend to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A system for manufacturing a two-part fastener, the system comprising:
   a fastener-molding housing including a fastener mold having a first mold section connected to a second mold section through a flash connection mold section, wherein the fastener mold is configured to receive fastener-forming material to form a pre-engaged fastener having a first fastener portion within the first mold section and a second fastener portion within the second mold section, wherein the first fastener portion is temporarily secured to the second fastener portion through a flash connection portion formed within the flash connection mold section; and
   an actuating assembly including a stripper plate, a connecting member having a distal beam within a retaining sleeve that is moveably secured to the stripper plate, and at least one ejection member, wherein the connecting member is configured to securely retain the first fastener portion, wherein the stripper plate is configured to be moved relative to the connecting member in order to drive one of the first or second fastener portions into the other of the first or second fastener portions to form a fully-formed fastener, wherein the stripper plate is positioned around at least a portion of the connecting member as the stripper plate is moved relative to the connecting member, and wherein the at least one ejection member is configured to eject the fully-formed fastener from the actuating assembly.

2. The system of claim 1, further comprising a fill housing connected to the fastener-molding housing, wherein the fill housing comprises an internal chamber having a fill inlet at a first end and an outlet gate at a second end, wherein the outlet gate is in fluid communication with a mold inlet of the fastener mold, and wherein fastener-forming material is configured to be deposited into the internal chamber through the fill inlet.

3. The system of claim 1, wherein one or both of the pre-engaged fastener or the connecting member comprises at least one undercut portion configured to securely retain the first fastener portion to the connecting member.

4. The system of claim 3, wherein the at least one undercut portion comprises inwardly-angled ledges formed on the connecting member.

5. The system of claim 3, wherein the at least one undercut portion comprises cored-out portions formed on or in the first fastener portion.

6. The system of claim 1, wherein the first fastener portion comprises a pin and the second fastener portion comprises a grommet.

7. The system of claim 1, wherein the fastener-molding housing is selectively actuated between open and closed positions, wherein the pre-engaged fastener is formed within the fastener mold in the closed position, and wherein the pre-engaged fastener is exposed in the open position.

8. The system of claim 7, further comprising at least one actuator that moves the fastener-molding housing between the open and closed positions.

9. The system of claim 1, wherein the stripper plate is operatively connected to at least one actuating member configured to move the stripper plate relative to the connecting member.

10. The system of claim 9, wherein the actuating member comprises a piston assembly.

11. The system of claim 1, further comprising a controller operatively connected to the fastener-molding housing and the actuating assembly, wherein the controller is configured to control operation of the system.

12. A method of manufacturing a two-part fastener, the method comprising:
depositing fastener-forming material into a fastener mold having a first mold section connected to a second mold section through a flash connection mold section;
allowing the fastener-forming material to harden within the fastener mold to form a pre-engaged fastener having a first fastener portion within the first mold section and a second fastener portion within the second mold section, wherein the first fastener portion is temporarily secured to the second fastener portion through a flash connection portion formed within the flash connection mold section;
securely retaining the first fastener portion of the pre-engaged connector with a connecting member of an actuating assembly, wherein the connecting member has a distal beam within a retaining sleeve that is moveably secured to a stripper plate of the actuating assembly;
moving the stripper plate of the actuating assembly relative to the connecting member, wherein the stripper plate is positioned around at least a portion of the connecting member as the stripper plate is moved relative to the connecting member;
driving one of the first or second fastener portions into the other of the first or second fastener portions through the moving operation to form a fully-formed fastener; and
ejecting the fully-formed fastener from the actuating assembly.

13. The method of claim 12, further comprising:
depositing the fastener-forming material into an internal chamber of a fill housing positioned over the fastener mold; and
allowing the fastener-forming material to pass into the fastener mold through an outlet gate of the fill housing.

14. The method of claim 12, securely retaining the first fastener portion of the pre-engaged fastener to the connecting member through at least one undercut portion.

15. The method of claim 14, wherein the at least one undercut portion comprises inwardly-angled ledges formed on the connecting member.

16. The method of claim 14, wherein the at least one undercut portion comprises cored-out portions formed on or in the first fastener portion.

17. The method of claim 12, wherein the first fastener portion comprises a pin and the second fastener portion comprises a grommet.

18. The method of claim 12, further comprising selectively actuating the fastener-molding housing between open and closed positions, wherein the pre-engaged fastener is formed within the fastener mold in the closed position, and wherein the pre-engaged fastener is exposed in the open position.

19. The method of claim 12, further comprising moving the stripper plate relative to the connecting member with at least one actuating member.

20. The method of claim 12, further comprising controlling the depositing, allowing, moving, driving, and ejecting operations with a controller.

* * * * *